United States Patent [19]

Nakamura

[11] 4,281,337
[45] Jul. 28, 1981

[54] APPARATUS FOR DETECTING THE COLOR TEMPERATURE OF A SOURCE OF LIGHT AND AUTOMATIC WHITE BALANCING MEANS FOR USE THEREWITH

[75] Inventor: Takashi Nakamura, Hatano, Japan

[73] Assignee: Sony Corporation, Tokyo, Japan

[21] Appl. No.: 20,036

[22] Filed: Mar. 13, 1979

[30] Foreign Application Priority Data

Mar. 15, 1978 [JP] Japan ................................. 53/29554

[51] Int. Cl.$^3$ ........................................... H04N 9/535
[52] U.S. Cl. ..................................... 358/29; 356/425
[58] Field of Search ........................... 358/29; 356/425

[56] References Cited

U.S. PATENT DOCUMENTS

3,626,088  12/1971  Schneider .............................. 358/29
3,772,462  11/1973  Schneider .............................. 358/29

FOREIGN PATENT DOCUMENTS

1254998  11/1971  United Kingdom .

Primary Examiner—Richard Murray
Attorney, Agent, or Firm—Lewis H. Eslinger; Alvin Sinderbrand

[57] ABSTRACT

Apparatus for detecting the color temperature of a source of light for use in, for example, a color television camera. First and second semiconductor photo-sensing elements are connected in series and are oppositely poled with respect to each other. Light of predetermined, respective colors having respectively different spectral characteristics is supplied to the first and second photo-sensing elements, for example, through different light filters. An output signal is derived from the opposite ends of the series circuit representing the color temperature of the light source. In a preferred embodiment, the output signal is produced by an operational amplifier having a pair of inputs, one of which being connected to one end of the series circuit, an output connected to the opposite end of the series circuit, and a resistance connected between the two inputs of the operational amplifier, the derived output signal being a voltage across the operational amplifier output and other input. In one application, the output voltage produced by the operational amplifier is supplied to a differential amplifier which, in turn, provides first and second voltages representing the relative intensities of the light received by the photo-sensing elements. The difference between these first and second voltages is combined with first and second color video signal components, respectively, such as color difference signals, so as to vary the levels of these respective color video signal components. The first and second voltages also are used to adjust the levels of the respective color video signal component outputs from the combining means so as to be substantially equal to the white balanced levels thereof at a predetermined color temperature. In another application, the voltage produced by the operational amplifier is supplied to the differential amplifier by yet another amplifier, and the differential amplifier includes a constant current source having a control input supplied with a color component voltage, such as the red color signal voltage $V_R$ or the blue color signal voltage $V_B$. The differential amplifier has a single output for providing a white-balanced red or blue color signal voltage.

13 Claims, 7 Drawing Figures

APPARATUS FOR DETECTING THE COLOR TEMPERATURE OF A SOURCE OF LIGHT AND AUTOMATIC WHITE BALANCING MEANS FOR USE THEREWITH

BACKGROUND OF THE INVENTION

This invention relates to apparatus for detecting the color temperature of a source of light and, more particularly, to such apparatus which produces an output signal representative of the color temperature and wherein that output signal can be used in, for example, an automatic white balance control circuit for a color television camera.

The color temperature of a source of light in, for example, a televised scene, determines the spectral characteristics of the various colors of light which is reflected from the televised object. If the light source is changed, the color temperature of the surrounding light also may change, whereby the spectral characteristics of the different color components of the light reflected from the very same object likewise will change. For example, when a source of light of relatively low color temperature is used, measurements of the spectral characteristics of light which is reflected from, for example, a white reference, indicate that the relative energy, or intensity, of light in the red passband is greater than the relative energy, or intensity, of light in the blue passband. Conversely, when the light source admits of a higher color temperature, the relative energy of light in the blue passband exceeds that of the light in the red passband.

In color television applications, if the image of a white object is projected to a color television camera, the resultant video picture of that object also must be white. For pure white objects, the red, blue and green color signal components produced by the color camera should be present in the ratio of 1:1:1. Of course, the color signal components which are produced by the camera are dependent upon the relative intensities, or energies, of the different colors of light which are received by that camera. However, as noted above, these intensities are dependent upon the color temperature of the light source which is used to illuminate the televised object. Thus, if the television picture of a pure white object appears as a pure white image for one light source, a change in the color temperature of that source, as by replacing it with another light source, will result in a television picture which does not appear as a pure white object. This is because, as the color temperature of the light source is changed, the intensities of the red, blue and green light images which are reflected to the television camera no longer will be present in the desired ratio of 1:1:1. For example, for a light source of a relatively lower color temperature, the intensity of red light reflected from a pure white object may exceed the intensity of green light which, in turn, may exceed the intensity of blue light. Conversely, for a color source of relatively higher color temperature, the intensity of blue light in the reflected light image of a white object may exceed that of the green light which, in turn, may exceed that of the red light.

To account for the effect of a change in the color temperature of the light source, it is conventional to provide a color television camera with a so-called white balance adjustment. This serves to adjust the magnitude of the respective color signals, e.g. the red, blue and green color signals, so that they will exhibit the proper ratio even though the ratio of red to blue to green light intensities received by the camera is not 1:1:1. Typically, such white balance adjustment is attained by using a white reference as the televised object, and then manually adjusting the respective color signals which are produced by the camera in response to that object. If the color temperature of the light source is known, this manual adjustment is not overly difficult. Unfortunately, it often is not a simple task to determine the color temperature. Also, it is desirable to ascertain whether the color temperature of a light source varies over a period of time. If color temperature can be detected or measured accurately, the color video signal components produced by a color television camera can be controlled in response to the detected color temperature so as to automatically attain a white balance adjustment.

OBJECTS OF THE INVENTION

Therefore, it is an object of the present invention to provide apparatus for detecting the color temperature of a source of light.

Another object of this invention is to provide apparatus of the type described wherein an output signal representing the color temperature is produced.

A still further object of this invention is to provide apparatus for automatically adjusting the white-balance condition of color video signals in accordance with the color temperature of the light source which is used in illuminating a televised scene.

An additional object of this invention is to produce white-balanced color difference signals, such as the red (R-Y) and blue (B-Y) difference signals as a function of detected color temperature of a televised scene.

Yet another object of this invention is to provide white-balanced red (R) and blue (B) color video signals as a function of the color temperature of the light source that is used to illuminate a televised scene.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for detecting the color temperature of a source of light, such as the light source which is used to illuminate a televised scene. First and second semiconductor photo-sensing elements are connected, oppositely poled to each other, in series circuit. Light of predetermined, respective colors having respectively different spectral characteristics is supplied to the photo-sensing elements, such as through respective (e.g. red and blue) light filters. An output signal is provided from the opposite ends of the series circuit representing the color temperature of the light source. In one embodiment, this output signal is a voltage produced at the output of an operational amplifier, said output being connected to one end of the series circuit, and the operational amplifier including one input connected to the other end of the series circuit and another input which is connected through a resistor to the said other end of the series circuit. In one application, the voltage produced by the operational amplifier is supplied to a white-balance adjustment circuit for adjusting the levels of color difference video signals (e.g. R-Y and B-Y video signals) to exhibit their proper white-balanced ratio. This white-balance adjustment circuit includes a differential amplifier having first and second outputs for providing first and second voltages representing the relative intensities of the light of different colors which are received by the photo-sensing elements. The difference between these voltages, which represents the white unbalance due to the temperature of the light source, is combined with each of the color difference signals so as to vary the levels of those signals, and then the level-varied signals are further adjusted as a function of the respective first and second voltages so as to produce white-balanced color difference signals. In another embodiment, the white-balance adjustment circuit produces white-balanced color signal components (e.g. R and B components) by supplying the output voltage produced by the operational amplifier to a differential amplifier via another amplifier of predetermined gain, and wherein the differential amplifier includes a current source whose current magnitude is controlled by the color signal voltage (e.g. $V_R$ or $V_B$) produced by the camera as a function of the televised object, in response to the particular color temperature of the illuminating light.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
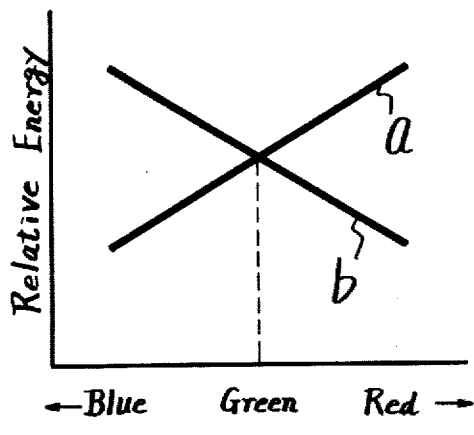
FIG. 1 is a graphical representation of the different spectral energies as a function of the color temperature of a source of light.

Referring now to the drawings, wherein like reference numerals are used throughout, reference first is made to FIG. 1 which is a graphical representation showing the different spectral characteristics of, for example, white light which is reflected from a reference, as a function of the color temperature of the light which is used to illuminate that reference. Curve a represents the spectral characteristics of white light that is reflected from a white reference illuminated by a source of light of relatively low color temperature. It is seen that the intensity of light in the red spectral region exceeds the intensity of light in the blue spectral region, with light in the green spectral region being selected as a reference level. Curve b represents the spectral characteristics of light which is reflected from the white reference when the light source exhibits a relatively higher color temperature. As is evident, the intensity of light in the blue spectral region exceeds the intensity of light in the red spectral region, again with light in the green spectral region being selected as the reference level. When light having the color temperature represented by curve a is used to illuminate an object for a televised scene, the respective levels of the color video signals produced by a color television camera may exhibit the proper ratios such that these color video signals are white-balanced. This means that if a pure white reference object is televised, with white-balanced color video signal components, the resultant television picture which is produced will appear as a pure white object. However, if the light source having the color temperature represented by curve b is used, it is appreciated that the different spectral characteristics of this new light source will result in color video signal components which are not white-balanced. That is, the ratios of the intensities of light in the different color spectral regions will be different such that the ratios of the color video signal components no longer will be present in the aforementioned white-balanced ratios. Consequently, a white-balance adjustment must be performed on the color video signal components which are produced when the light source having the color temperature represented by curve b is used.

The present invention proceeds upon the principle that the color temperature of a source of light can be detected as a function of the ratio of the intensities of light in the red and blue spectral regions, respectively. That is, if $l_R$ represents the intensity of light in the red spectral region, referred to hereinafter as red light, and if $l_B$ represents the intensity of light in the blue spectral region, referred to hereinafter as blue light, then the color temperature of the light source is a function of $l_R/l_B$. When this ratio is greater than unity, the color temperature is of the type represented by curve a, and when this ratio is less than unity, the color temperature is of the type represented by curve b, as shown in FIG. 1. An embodiment of color temperature detecting apparatus is shown schematically in FIG. 2 as comprising semiconductor photo-sensing elements 1 and 2 which are connected in series relationship between terminals 3 and 4. In the illustrated embodiment, each photo-sensing element is a photodiode, these photodiodes being connected in series circuit and being oppositely poled with respect to each other such that terminal 3 is connected to the anode of photodiode 1, terminal 4 is connected to the anode of photodiode 2, and the cathodes of both photodiodes are connected to each other. In an alternative embodiment, each photodiode may be replaced by a phototransistor.

Photodiode 1 is adapted to receive red light, represented as $L_R$, and photodiode 2 is adapted to receive blue light, represented as $L_B$. To this effect, a red color filter 5 may be interposed in front of photodiode 1 so as to allow only red light $L_R$ to pass therethrough to this photodiode. Similarly, a blue color filter 6 may be positioned in front of photodiode 2 so as to allow only blue light $L_B$ to pass therethrough to the photodiode. As an alternative, each photodiode may include semiconductor material which is sensitive primarily only to red or blue light, respectively. If it is assumed that red and blue light filters 5 and 6, respectively, are provided, then the intensity of the red light which is incident upon photodiode 1 may be represented as $l_R$, and the intensity of the blue light which is incident upon photodiode 2 may be represented as $l_B$. For the purpose of the present discussion, it is assumed that the red and blue light which are incident upon the photodiodes are reflected from, for example, a white reference which, in turn, is illuminated with light from a source whose color temperature is to be detected.

Figure 2:
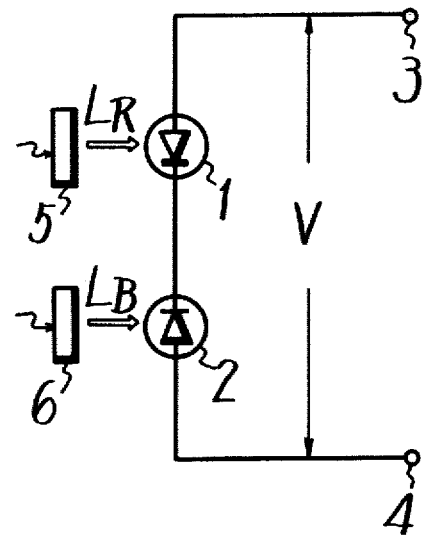
FIG. 2 is a schematic diagram of a basic embodiment of the present invention.

With the embodiment illustrated in FIG. 2, a very small current flows through photodiodes 1 and 2. This current produces a voltage V between terminals 3 and 4. This voltage V may be expressed as:

$$V = \frac{kT}{q} \log \frac{I_R}{I_B} \quad (1)$$

wherein T is the absolute temperature in degrees Kelvin. From equation (1), it seen that the voltage V provided across terminals 3 and 4 is a function of the ratio of the intensity of red light $I_R$ to the intensity of blue light $I_B$.

Figure 3:
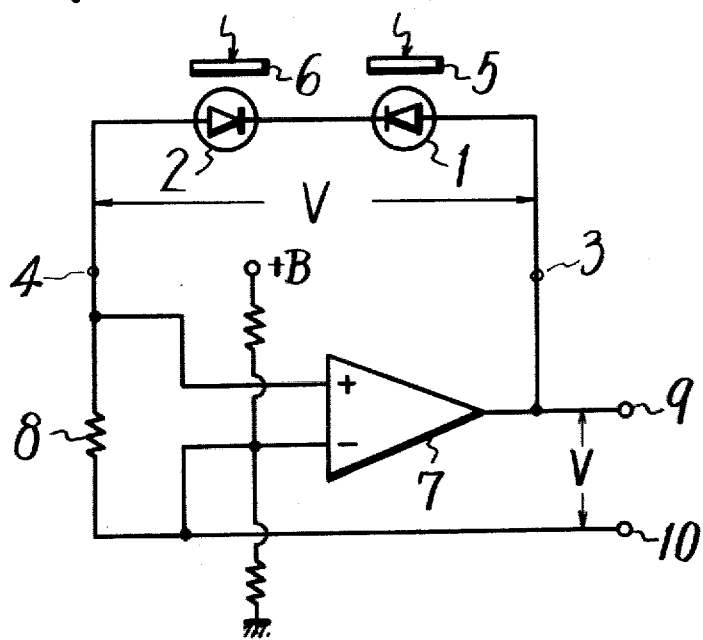
FIG. 3 is a schematic diagram of another embodiment of color temperature detecting apparatus in accordance with the present invention.

Another embodiment of a circuit for detecting the color temperature of a source of light is shown in FIG. 3. In this embodiment, output terminals 3 and 4 are connected to an operational amplifier 7. In particular, this operational amplifier includes a non-inverting input (+) and an inverting input (−) across which a resistor 8 is connected. The inverting input is supplied with a predetermined bias potential derived from a suitable source of operating voltage +B through a voltage divider, as illustrated. The output of operational amplifier 7 is connected to one end of the series circuit formed of photodiodes 1 and 2, that is, to terminal 3, and the non-inverting input of the operational amplifier is connected to the other end of this series circuit, that is, to terminal 4. Output terminals 9 and 10 are connected to the output of operational amplifier 7 and to the inverting input thereof, respectively.

Operational amplifier 7 may be conventional such that, as is typical, it has an extremely high input impedance and a very low output impedance. Because of its high input impedance, the voltage across its inverting and non-inverting input terminals is substantially equal to zero. Thus, the potential at terminal 4, ie., the potential at the non-inverting input of operational amplifier 7, is equal to the potential at output terminal 10, i.e., the inverting input of the operational amplifier. Consequently, the voltage V across terminals 3 and 4 of the series circuit formed of photodiodes 1 and 2, is seen to be equal to the voltage V across output terminals 9 and 10 of operational amplifier 7. Hence, the output voltage expressed by equation (1) is obtained at a low output impedance.

Figure 4:
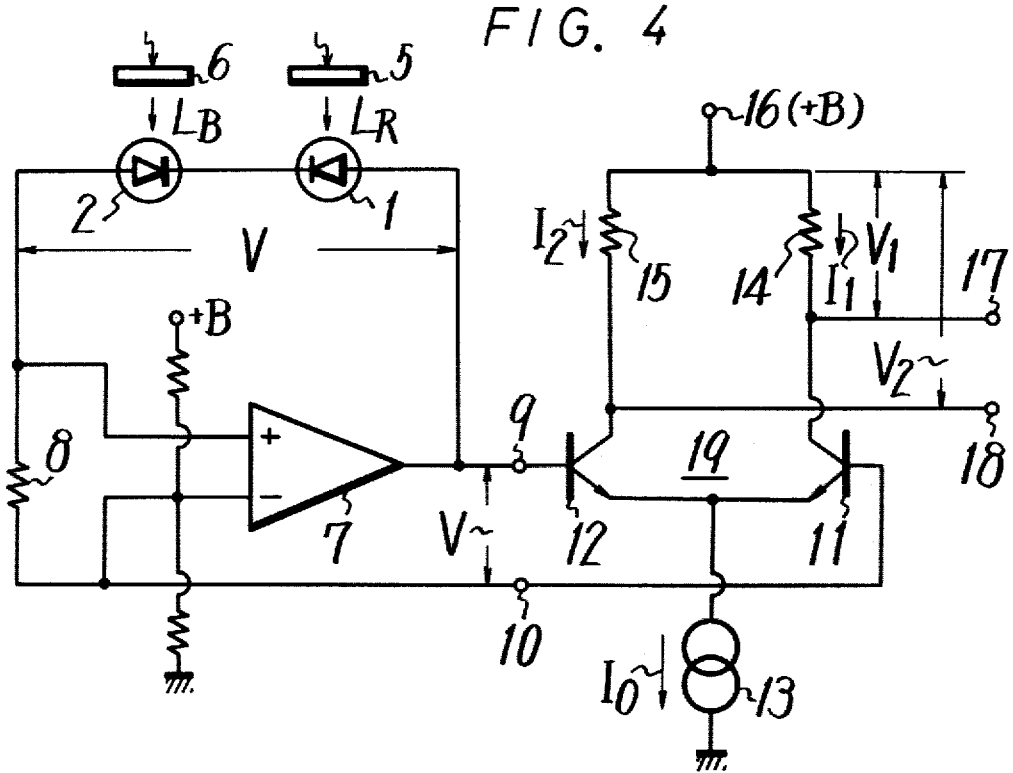
FIG. 4 is a schematic diagram of yet another embodiment of color temperature detecting apparatus in accordance with this invention.

As seen from equation (1), output voltage V, which represents the color temperature of the light source is dependent upon ambient temperature T and is expressed as an exponential function. This temperature dependency can be compensated by supplying output voltage V to a differential amplifier which includes semiconductor devices having PN junctions, which junctions are dependent upon ambient temperature in a similar manner. An example of such a differential amplifier is illustrated in FIG. 4. As shown therein, differential amplifier 19 is comprised of transistors 11 and 12, depicted as npn transistors, with the base electrode of transistor 11 being connected to output terminal 10 and with the base electrode of transistor 12 being connected to output terminal 9. These transistors have their emitter electrodes connected in common to a constant current source 13 which is adapted to generate a constant current represented as $I_0$. A source 16 of operating potential +B is connected via resistors 14 and 15 to the collector electrodes of transistors 11 and 12, respectively. Differential amplifier 19 includes outputs 17 and 18 which are derived from the collector electrodes of transistors 11 and 12, respectively.

Let it be assumed that the current amplification factor of transistor 11 is represented as $\alpha_1$, and that the current amplification factor of transistor 12 is represented as $\alpha_2$. The collector current of transistor 11 may be expressed as:

$$I_1 = \frac{I_0 \alpha_1}{1 + \text{Exp}\left(-\frac{q}{kT}\right) V} \quad (2)$$

In the foregoing equation, the voltage V is the voltage produced at output terminals 9 and 10 and expressed as equation (1) above. If equation (1) is substituted for the expression V in equation (2), then equation (2) can be rewritten as:

$$I_1 = \frac{I_0 \alpha_1}{1 + \frac{I_R}{I_B}} \quad (3)$$

The collector current $I_2$ of transistor 12 can be derived in a similar manner, and thus may be expressed as:

$$I_2 = \frac{I_0 \alpha_2}{1 + \frac{I_B}{I_R}} \quad (4)$$

The voltage provided at output 17 of differential amplifier 19 is equal to the product of the current $I_1$ through resistor 14 and the resistance $R_1$ of that resistor. Similarly, the voltage $V_2$ derived at output 18 of the differential amplifier is equal to the product of the current $I_2$ through resistor 15 and the resistance $R_2$ of that resistor. When equations (3) and (4) are used to represent collector currents $I_1$ and $I_2$, respectively, then the voltages $V_1$ and $V_2$ provided at outputs 17 and 18 may be expressed as:

$$V_1 = I_1 R_1 = \frac{I_B}{I_R + I_B} \cdot R_1 I_0 \alpha_1 \quad (5)$$

$$V_2 = I_2 R_2 = \frac{I_R}{I_R + I_B} \cdot R_2 I_0 \alpha_2 \quad (6)$$

Transistors 11 and 12 can be selected so as to have equal amplification factors such that $\alpha_1 = \alpha_2$. Furthermore, resistors 14 and 15 may be selected to have equal resistance values such that $R_1 = R_2$. Since the current $I_0$ produced by current source 13 is constant, it is seen that the output voltages $V_1$ and $V_2$ provided at outputs 17 and 18 of differential amplifier 19, and expressed by equations (5) and (6) vary as a function of the intensities of the blue and red light $I_B$ and $I_R$, respectively, incident on photodiodes 2 and 1. If output voltage $V_1$ exceeds output voltage $V_2$, then the blue light intensity $I_B$ is greater than the red light intensity $I_R$, meaning that the color temperature of the light source is relatively higher, as depicted by curve b in FIG. 1. Conversely, if output voltage $V_2$ exceeds output voltage $V_1$, then the red light intensity $I_R$ is greater than the blue light intensity $I_B$, meaning that the color temperature of the light source is relatively lower, as represented by curve a in FIG. 1. If desired, a display device may be connected to outputs 17 and 18 so as to display the relative values of output voltages $V_1$ and $V_2$, thereby displaying an indication of the detected color temperature of the light source.

For some particular color temperature, the intensities of the red and blue light may equal, resulting in $l_R=l_B$, and $V_1=V_2$. This condition may be obtained by selecting appropriate red and blue color filters 5 and 6. Furthermore, this condition represents a white balance in the color video signals which may be produced by a color television camera in response to the televised image of the white reference which is used to project light to photodiodes 1 and 2. That is, for a white balance condition of illuminating light from a source having a particular color temperature, output voltages $V_1$ and $V_2$ derived at outputs 17 and 18 are equal. If the color temperature of the light source changes, or if a different light source is used, the intensities of the red and blue light no longer will be equal to each other. If the intensity of the blue light increases relative to that of the red light, then voltage $V_1$ will be greater than voltage $V_2$. Conversely, if the intensity of the red light increases relative to that of the blue light, then voltage $V_2$ will be greater than voltage $V_1$. Thus, merely by detecting these output voltages, a representation of the color temperature of the light source which is used to illuminate the televised scene can be obtained. Furthermore, the output voltages provided at outputs 17 and 18 can be used to attain an automatic white-balance adjustment of the color video signal components produced by the television camera.

Figure 5:
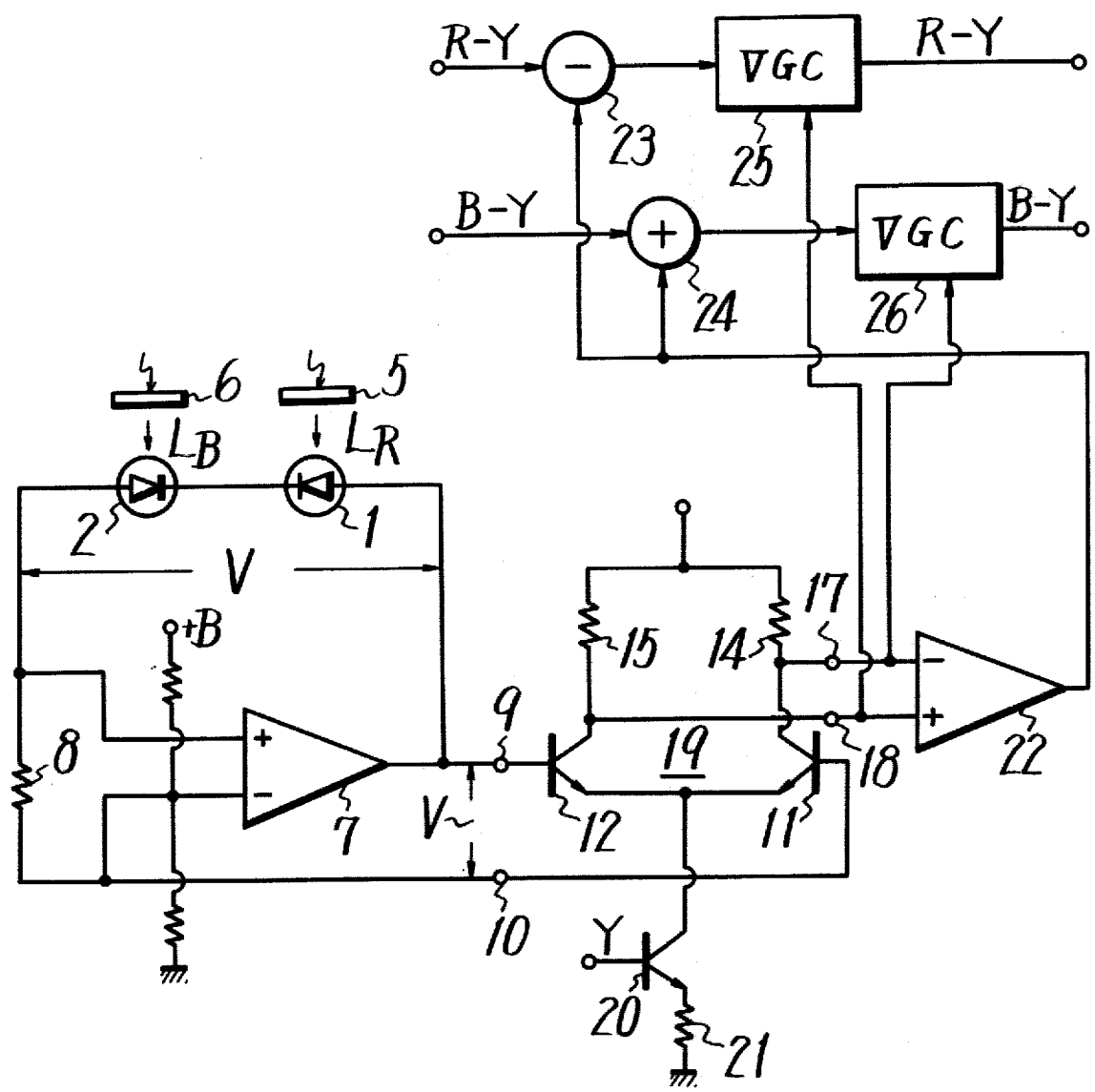
FIG. 5 is a schematic diagram of one embodiment of white-balance adjustment circuitry which uses the color temperature detecting apparatus of this invention.

One embodiment of white-balance adjustment circuitry which can be used with the color temperature detecting apparatus of the present invention is illustrated in FIG. 5. In the illustrated embodiment, it is assumed that the television camera which is used with this apparatus produces color difference signals, such as a red color difference signal (R-Y) and a blue color difference signal (B-Y). These color difference signals are produced by the television camera when an illuminated white reference is imaged onto the camera. Hence, the red color difference signal (R-Y) is derived from the red light included in this reflected white light, and the blue color difference signal (B-Y) is derived from the blue light which is included in this reflected light.

The white-balance adjustment circuitry is comprised of a difference circuit 22, combining circuits 23 and 24 and variable gain control circuits 25 and 26. Difference circuit 22 may comprise, for example, an operational amplifier, a differential amplifier, or the like, having an inverting input connected to output 17 and a non-inverting input connected to output 18, these outputs being derived from differential amplifier 19. The output of difference circuit 22, which is a function of the difference between voltage $V_2$ at output 18 and voltage $V_1$ at output 17, is supplied to each of combining circuits 23 and 24. Combining circuit 23 is a subtracting circuit having an additional input connected to receive the red color difference signal (R-Y) from which the output of difference circuit 22 is subtracted. Combining circuit 24 is an adding circuit having another input connected to receive the blue color difference signal (B-Y) to which the output of difference circuit 22 is added. The output of subtracting circuit 23 is connected to variable gain circuit 25 which, for example, may comprise an amplifier having an adjustable gain, this variable gain circuit having a gain-controlling input connected to receive voltage $V_2$ at output 18. Similarly, variable gain circuit 26 is connected to the output of adding circuit 24 and includes a gain-controlling input connected to receive voltage $V_1$ at output 17. The outputs of variable gain circuits 25 and 26 are white-balanced red and blue color difference signals, respectively.

In the illustrated white-balance adjustment circuitry, constant current source 13 which had been connected to differential amplifier 19 in FIG. 4 is formed of a transistor 20 whose collector-emitter circuit is connected in series with a resistor 21, and whose base electrode is supplied with the luminance component Y of the video signal produced by the television camera.

In operation, let it be assumed that for proper white balance with a light source having a predetermined color temperature, the red, blue and green signal components produced by the color television camera exhibit the ratio of 1:1:1. At this color temperature, and for white balance, the red light intensity $l_R$ which passes through filter 5 and is incident upon photodiode 1 is equal to the blue light intensity $l_B$ which passes through the blue filter 6 and which is incident upon photodiode 2.

Let it be assumed that the collector current of current source transistor 20 is represented as:

$$i_0 = \frac{\alpha_3}{R_3} Y \tag{7}$$

wherein $\alpha_3$ is the current amplification factor of transistor 20, $R_3$ is the resistance of resistor 21 and Y is the luminance component supplied to the base electrode of transistor 20.

Equations (5) and (6), above, can be used to derive voltages $V_{17}$ and $V_{18}$ provided at outputs 17 and 18, respectively, of differential amplifier 19. These voltages can be expressed as:

$$V_{17} = \frac{l_B}{l_R + l_B} \cdot i_0 \alpha_1 R_1 \tag{8}$$

$$V_{18} = \frac{l_R}{l_R + l_B} \cdot i_0 \alpha_2 R_2 \tag{9}$$

Consistent with the foregoing assumption, the resistances of resistors 14 and 15 are equal ($R_1=R_2$) and the current amplification factors of transistors 11 and 12 also are equal ($\alpha_1=\alpha_2$). Thus, the difference between voltages $V_{18}$ and $V_{17}$ can be represented as $V_{18-17}$ which is expressed as:

$$V_{18-17} = \frac{l_R - l_B}{l_R + l_B} \cdot \alpha_1 \alpha_3 \frac{R_1}{R_3} Y \tag{10}$$

Resistance values $R_1$ and $R_3$ as well as current amplification factors $\alpha_1$ and $\alpha_3$ may be selected such that $\alpha_1\alpha_3 (R_1/R_3)$ is equal to unity. With this selection, equation (10) can be rewritten as:

$$V_{18-17} = \frac{l_R - l_B}{l_R + l_B} Y \tag{11}$$

When white balance at the proper color temperature is obtained, the red light intensity $l_R$ is equal to the blue light intensity $l_B$ ($l_R=l_B$), and equation (11) is equal to zero. If the difference voltage $V_{18-17}$ is equal to zero, then zero is subtracted from the red color difference signal (R-Y) supplied to subtracting circuit 23, and zero is added to the blue color difference signal (B-Y) supplied to adding circuit 24. Consequently, the respective levels of these color difference signals remain unchanged. Furthermore, in the white balance condition, $V_{17}=V_{18}$. Hence, the respective gains of variable gain circuits 25 and 26 are maintained without change. That is, the gain of variable gain circuit 25 maintains the same ratio with respect to the gain of variable gain circuit 26 as initially preset. Consequently, for the white balance condition at the particular color temperature, the color temperature detecting apparatus produces no change in the respective levels of the red and blue color difference signals produced at the outputs of the variable gain circuits.

Let it now be assumed that the color temperature of the light source is changed. Accordingly, the spectral characteristics of the light reflected from the white reference will differ from the white-balanced condition, as represented by the curves shown in FIG. 1. The red and blue light intensities will change differentially. For example, if it is assumed that the red light intensity $l_R$ increases by 20% with respect to the green light intensity, then the blue light intensity $l_B$ decreases by 20%. If $l_{RO}$ represents the red light intensity for the white-balanced condition, and if $l_{BO}$ represents the blue light intensity for the white-balanced condition, then the difference voltage $V_{18-17}$ produced by differencing circuit 22, as expressed in equation (11), appears as:

$$V_{18-17} = \frac{1.2 l_{RO} - 0.8 l_{BO}}{1.2 l_{RO} + 0.8 l_{BO}} Y \tag{12}$$

At the white-balanced condition, the effective intensities of the red and blue light are equal. Therefore, since $l_{RO}=l_{BO}$, equation (12) reduces to:

$$V_{18-17}=0.2Y \tag{13}$$

If the red video signal component derived from the television camera at the white-balanced condition is represented as $R_0$, and if the blue color video signal component derived from the television camera at the white-balanced condition is represented as $B_0$, then the red and blue color difference signals which are supplied to combining circuits 23 and 24 in accordance with the present example may be expressed as $(1.2R_0-Y)$ and $(0.8B_0-Y)$, respectively. The difference signal $V_{18-17}$, as expressed in equation (13), is subtracted from the red color difference signal in subtracting circuit 23 and is added to the blue color difference signal in adding circuit 24, resulting in red and blue color difference signals which are expressed as:

$$(1.2R_0-Y)-0.2Y=1.2(R_0-Y) \tag{14}$$

$$(0.8B_0-Y)+0.2Y=0.8(B_0-Y) \tag{15}$$

It is seen that, when the color temperature of the light source is changed, combining circuits 23 and 24 each produces a respective color difference signal that is greater or less than the white-balanced color difference signal previously produced thereby. In the present example wherein it is assumed that the red light intensity increases and the blue light intensity decreases, the level of the red color difference signal is increased over its white-balanced level by a proportionate amount, and the level of the blue color difference signal is reduced from its white-balanced level by a proportionate amount.

The voltages $V_{17}$ and $V_{18}$ provided at outputs 17 and 18 of differential amplifier 19 in response to this change in the color temperature of the light source may be expressed as:

$$V_{17} = \frac{0.8 l_{BO}}{1.2 l_{RO} + 0.8 l_{BO}} i_0 \alpha_1 R_1 \tag{16}$$

$$V_{18} = \frac{1.2 l_{RO}}{1.2 l_{RO} + 0.8 l_{BO}} i_0 \alpha_2 R_2 \tag{17}$$

Voltage $V_{17}$ is supplied as the gain-controlling voltage to variable gain circuit 26 and voltage $V_{18}$ is supplied as the gain-controlling voltage to variable gain circuit 25. Gain-controlling voltage $V_{17}$ tends to increase the gain of variable gain circuit 26 so as to adjust the level of the blue color difference signal supplied thereto, and expressed in equation (15), to its white-balanced level $(B_0-Y)$. Similarly, gain-controlling voltage $V_{18}$ controls the gain of variable gain circuit 25 to adjust the level of the red color difference signal supplied thereto, whereby this red color difference signal exhibits its white-balanced level $(R_0-Y)$. Thus, even though the red and blue video signal components will be changed if the color temperature of the light source changes, the illustrated white-balance adjustment circuitry automatically adjusts the levels of the red and blue color difference signals so as to be equal to their white-balanced levels.

It may be appreciated that, if the change in the color temperature of the light source produces only a small change in the color video signal components, the red and blue color difference signals obtained at the outputs of subtracting circuit 23 and adding circuit 24 may exhibit only a small change from the white-balanced levels thereof. In that event, variable gain circuits 25 and 26 can be omitted.

Figure 6:
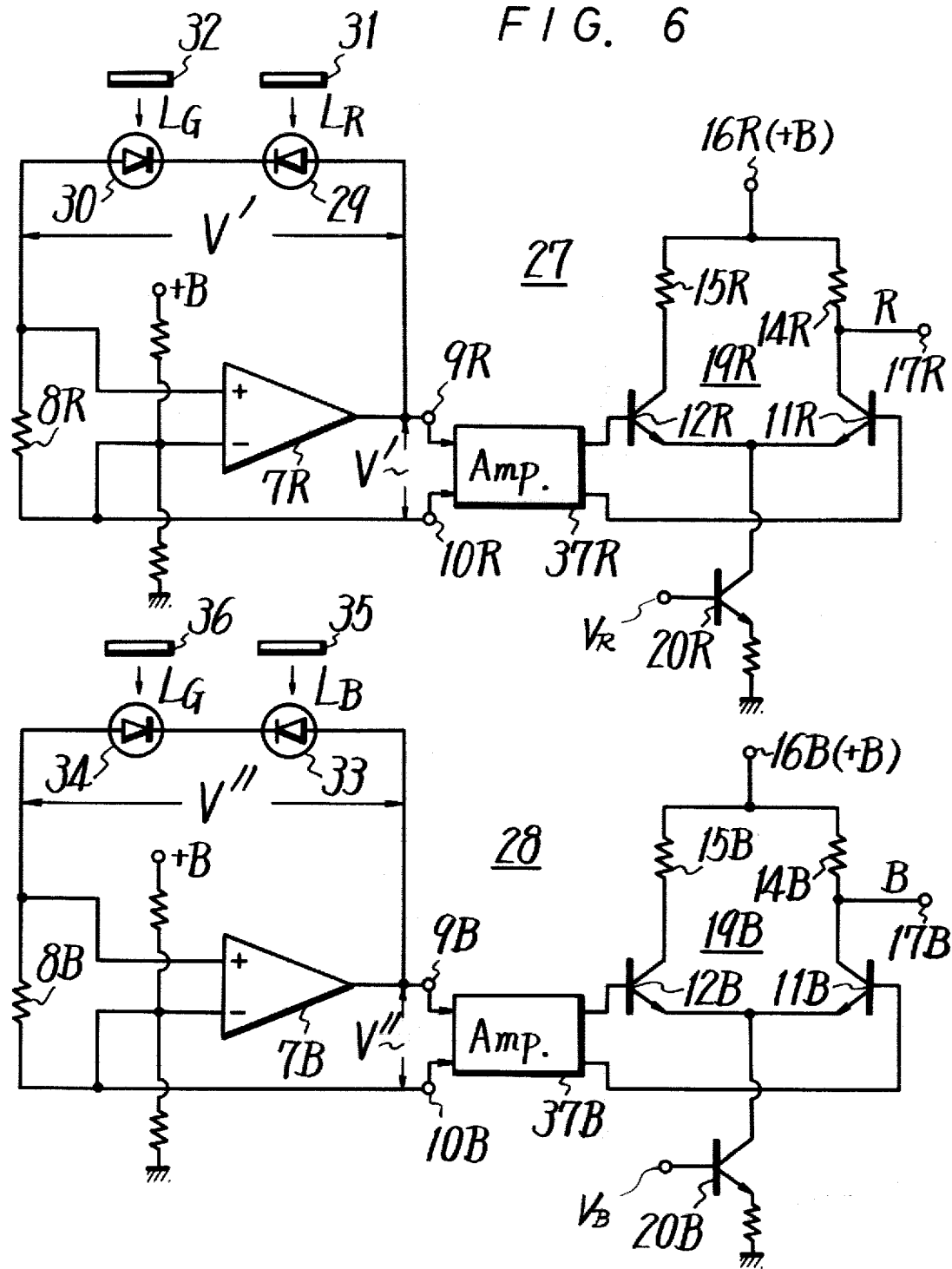
FIG. 6 is a schematic diagram of another embodiment of white-balance adjustment circuitry which uses the teachings of this invention.

The embodiment shown in FIG. 5 produces an automatic white-balance adjustment to the red and blue color difference signals produced by the color television camera. FIG. 6 is a schematic diagram of another embodiment of this invention wherein automatic white-balance adjustment of the color video signal components, such as the red and blue video signal components obtained from the color television camera, is attained. It is assumed, in this embodiment, that the camera produces a red video signal component $V_R$, a blue video signal component $V_B$ and a green video signal component $V_G$. The color temperature detecting apparatus described hereinabove is used in conjunction with white-balance adjusting circuitry 27 for white-balance adjustment of the red video signal component, and with white-balance adjusting circuitry 28 for white-balance adjustment of the blue video signal component. The color temperature detecting apparatus and white-balance adjusting circuitry for the red and blue video signal components are of similar construction and the same reference numerals are used to identify like component parts, with the addition of the suffix R to identify those components included in the circuitry associated with the red video signal component, and with the addition of the suffix B to identify those components included in the circuitry associated with the blue video signal component. It is further assumed that, although the color temperature of the light source may change, the light intensity in the green spectral region remains substantially constant. Hence, a white-balance adjustment for the green video signal component G is not necessary. However, and as mentioned above, a change in the color temperature of the light source may result in a differential change in the intensities of the red and blue light included in the white light which is reflected from the white reference.

The color temperature detecting apparatus associated with the red light is comprised of oppositely poled photodiodes 29 and 30 connected in series to provide a voltage V' representative of the color temperature of the light source. A red light filter 31 passes substantially only red light to photodiode 29 and a green light filter 32 passes substantially only green light to photodiode 30. An operational amplifier 7R having an input resistor 8R is connected to the photodiodes in the manner discussed above so as to produce an output voltage V' across output terminals 9R and 10R, this voltage V' having a mathematical representation similar to equation (1), above.

The color temperature detecting circuit associated with the blue light is comprised of oppositely poled photodiodes 33 and 34 connected in series to produce a voltage V'' which represents the color temperature of the light source. A blue light filter 35 passes substantially only blue light to photodiode 33, and a green light filter 36 passes substantially only green light to photodiode 34. An operational amplifier 7B, having an input resistor 8B, is connected to these photodiodes in the manner discussed above so as to provide an output voltage V''' across output terminals 9B and 10B. Voltage V''' may have a mathematical representation substantially similar to equation (1), above.

The white-balance adjusting circuitry associated with the red video signal component is comprised of a differential amplifier 19R having a current source transistor 20R supplied with a voltage $V_R$ representing the red video signal component derived from the color television camera. Differential amplifier 19R, which is similar to aforedescribed differential amplifier 19, has its input electrodes, i.e., the base electrodes of transistors 11R and 12R, connected to output terminals 10R and 9R, respectively, via an amplifier 37R. Differential amplifier 19R includes a single output 17R connected to the collector electrode of transistor 11R for producing the white-balanced red video signal component R.

The white-balance adjusting circuitry associated with the blue video signal component is comprised of differential amplifier 19B, which is similar to aforedescribed differential amplifier 19. Differential amplifier 19B has a current source transistor 20B whose base electrode is supplied with a voltage $V_B$ representing the blue video signal component derived from the color television camera. The input electrodes of differential amplifier 19B, i.e., the base electrodes of transistors 11B and 12B, are connected to output terminals 10B and 9B, respectively, via an amplifier 37B. The differential amplifier includes a single output terminal 17B connected to the collector electrode of transistor 11B to produce the white-balanced blue video signal component B.

When the white-balanced condition of the television camera is obtained, the ratio of the red light intensity $l_R$ to the green light intensity $l_G$ is equal to the ratio of the blue light intensity $l_B$ to the green light intensity, as follows:

$$\frac{l_R}{l_G} = \frac{l_B}{l_G} = 1 \tag{18a}$$

Similarly, in the white-balanced condition, the ratio of the voltage $V_R$ representing the red video signal component to the voltage $V_G$ representing the green video signal component is equal to the ratio of the voltage $V_B$ representing the blue video signal component to the voltage $V_G$, as follows:

$$\frac{V_R}{V_G} = \frac{V_B}{V_G} = 1 \tag{18b}$$

Let it be assumed that the amplification factor of amplifier 37R is represented as $a_R$ and that the amplification factor of amplifier 37B is represented as $a_B$. The output voltage $V_{RO}$ produced at output terminal 17R of differential amplifier 19R represents the red video signal component and is a function of the amplifier factor $a_R$ of amplifier 37R and the red video signal component voltage $V_R$. Similarly, the output voltage $V_{BO}$ produced at output terminal 17B of differential amplifier 19B represents the blue video signal component and is a function of the amplification factor $a_B$ of amplifier 37B and the blue video signal component voltage $V_B$. These output voltages $V_{RO}$ and $V_{BO}$ may be expressed as:

$$V_{RO} \propto \frac{1}{1 + \left(\frac{l_R}{l_G}\right)^{a_R}} \cdot V_R \propto \frac{1}{1 + \left(\frac{V_R}{V_G}\right)^{a_R}} \cdot V_R \tag{19}$$

$$V_{BO} \propto \frac{1}{1 + \left(\frac{l_B}{l_G}\right)^{a_B}} \cdot V_B \propto \frac{1}{1 + \left(\frac{V_B}{V_G}\right)^{a_B}} \cdot V_B \tag{20}$$

Let is be assumed that $x = V_R/V_G$ or that $x = V_B/V_G$. With these assumptions, equations (19) and (20) can be rewritten such that output voltages $V_{RO}$ and $V_{BO}$ may be expressed as functions of x, as follows:

$$V_{RO} \propto \frac{x}{1 + (x)^{a_R}} \cdot V_G \tag{21a}$$

$$V_{BO} \propto \frac{x}{1 + (x)^{a_B}} \cdot V_G \tag{21b}$$

When the white reference is imaged to the television camera, the green video signal component voltage $V_G$ may be assumed to be substantially constant regardless of the color temperature of the light source. Furthermore, if the expression $$\frac{x}{1 + (x)^{a_R}}$$

or if the expression $$\frac{x}{1 + (x)^{a_B}}$$

can be made constant, that is, independent of x, then the output voltages $V_{RO}$ and $V_{BO}$, as expressed by equations (21a) and (21b) will be equal to their respective white-balanced voltages regardless of a change in the color temperature of the light source. That is, once the white-balanced voltage levels are determined for a particular color temperature, these white-balanced voltage levels will be substantially maintained even though the color temperature may vary.

Figure 7:
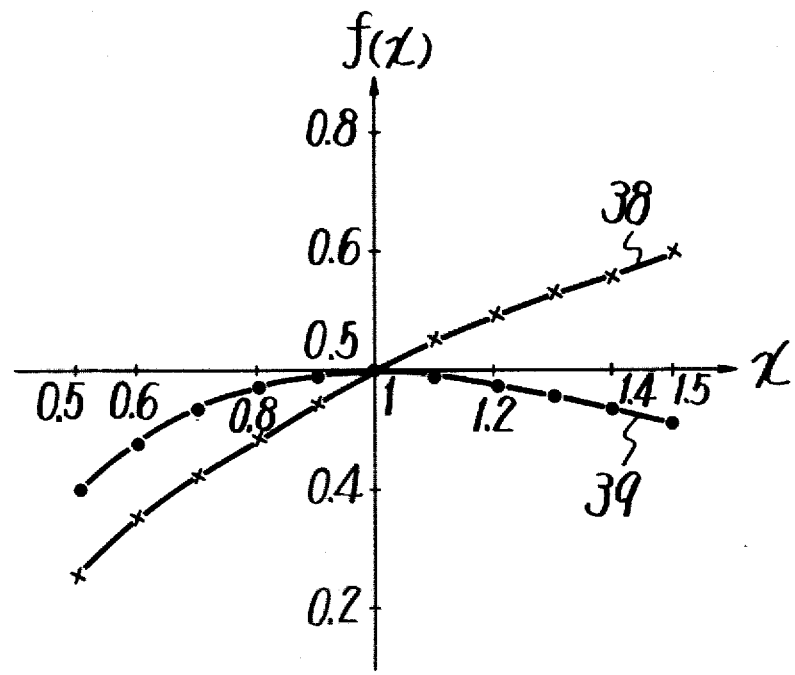
FIG. 7 is a graphical representation which is useful in explaining the operation of the embodiment shown in FIG. 6.

Let it be assumed that $$f(x) = \frac{x}{1 + (x)^{a_R}},$$

wherein the amplification factor $a_R$ is variable. If $a_R = 1$, then the function f(x) can be represented as $$f(x) = \frac{x}{1 + x},$$

and this function is represented by curve 38 in FIG. 7. If $a_R = 2$, then the function f(x) can be expressed as $$f(x) = \frac{x}{1 + x^2}$$

as shown by curve 39 in FIG. 7. When the amplification factor $a_R = 2$, it can be seen from curve 39 in FIG. 7 that, even though the variable x changes, due to a change in the color temperature of the light source, the red video signal component produced at output terminal 17R, as represented by the function f(x), undergoes only a negligible change even though x may vary from −30% to +40% of its white-balanced value. This means that, with proper selection of the amplification factor $a_R$, the red video signal component voltage $V_{RO}$, provided at output terminal 17R, remains substantially constant. Similarly, the proper selection of the amplification factor $a_B$ of amplifier 37B means that the blue video signal component voltage $V_{BO}$ provided at output terminal 17B remains substantially constant notwithstanding a change in the color temperature of the light source. Thus, an automatic white-balance adjustment is achieved for the red and blue video signal components even though the color temperature of the light source which is used to derive these components may change.

Curve 39 in FIG. 7 has been drawn for a single, constant amplification factor $a_R$ (or $a_B$). If this amplification factor is varied as the ratio $V_R/V_G$ or the ratio $V_B/V_G$ varies, then the function f(x) will be substantially constant over a greater range of x. This means that the automatic white-balance adjustment range likewise will be extended. Hence, the white-balance condition will be maintained even if there is a greater change in the color temperature of the light source.

While the present invention has been particularly shown and described with reference to various preferred embodiments thereof, it should be readily apparent to those of ordinary skill in the art that changes and modifications in form and details may be made without departing from the spirit and scope of the invention. It is intended that the appended claims be interpreted as including all such changes and modifications.

What is claimed is:

1. Apparatus for detecting the color temperature of a source of light, comprising first and second semiconductor photo-sensing elements connected in series circuit, said first and second photo-sensing elements being oppositely poled in said series circuit; means for supplying light of predetermined, respective colors having respectively different spectral characteristics to said first and second photo-sensing elements; and operational amplifier means connected to opposite ends of said series circuit said operational amplifier means having a pair of inputs and an output, one of said inputs being connected to one end of said series circuit and said output being connected to the opposite end of said series circuit; and resistance means connected across said one and the other of said inputs; whereby a voltage representing said color temperature and being substantially equal to the voltage across said series circuit is provided across said output and said other input of said operational amplifier means.

2. Apparatus for white color balance in the event that the color temperature of a televised scene changes from a predetermined level, comprising color temperature detecting means, including first and second semiconductor photosensing elements connected in series circuit, said first and second photo-sensing elements being oppositely poled in said series circuit, light-filter means for supplying light of predetermined respective colors having respectively different spectral characteristics to said first and second photo-sensing elements, and means coupled across opposite ends of said series circuit for producing a signal representing the color temperature of said televised scene; differential amplifier means connected to receive said signal and having first and second outputs for providing first and second voltages representing the relative intensities of the light received by said first and second photo-sensing elements, respectively; means for supplying first and second color video signal components corresponding to the respective colors of the light received by said first and second photo-sensing elements; first and second combining means for combining each of said first and second color video signal components with a signal representing the difference between said relative intensities of the light received by said first and second photo-sensing elements to vary the levels of said first and second color video signal components, respectively; and adjusting means coupled to said first and second combining means for adjusting the levels of the respective color video signal component outputs from said first and second combining means to substantially the white balanced levels thereof at said predetermined color temperature.

3. The apparatus of claim 2 wherein said first combining means comprises subtracting means for subtracting said signal representing the difference between said relative intensities of the light received by said first and second photo-sensing elements from said first color video signal component; and said second combining means comprises adding means for adding said signal representing the difference between said relative intensities of the light received by said first and second photo-sensing elements to said second color video signal component.

4. The apparatus of claim 3 further comprising differencing means connected to the outputs of said differential amplifier means to produce a signal representing the difference between said first and second voltages provided at said outputs, said last-mentioned signal being supplied to said subtracting means and to said adding means.

5. The apparatus of claim 4 wherein said first and second color video signal components comprise a red color difference signal (R-Y) and a blue color difference signal (B-Y), respectively.

6. The apparatus of claim 5 wherein said first voltage represents the relative intensity of blue light received by one of said photo-sensing elements and said second voltage represents the relative intensity of red light received by the other of said photo-sensing elements;

and wherein said adjusting means comprises first gain-controlled means connected to said adding means and having a gain determined by said first voltage to adjust the level of the blue color difference signal (B-Y) output from said adding means, and second gain-controlled means connected to said subtracting means and having a gain determined by said second voltage to adjust the level of the red color difference signal (R-Y) output from said subtracting means.

7. The apparatus of claim 3 wherein said adjusting means comprises first and second gain-controlled means connected to said subtracting means and to said adding means, respectively, the gain of said first gain-controlled means being determined by one of said first and second voltages and the gain of said second gain-controlled means being determined by the other of said first and second voltages.

8. Apparatus for white color balance in the event that the color temperature of a televised scene changes from a predetermined level, comprising color temperature detecting means, including first and second semiconductor photo-sensing elements connected in series circuit, said first and second photo-sensing elements being oppositely poled in said series circuit, light-filter means for supplying light of predetermined respective colors having respectively different spectral characteristics to said first and second photo-sensing elements, and means coupled across opposite ends of series circuit for producing a signal representing the color temperature of said televised scene; differential amplifier means connected to receive said signal and having first and second outputs for providing first and second voltages representing the relative intensities of the light received by said first and second photo-sensing elements, respectively; differencing means connected to the outputs of said differential amplifier means to produce a difference signal representing the difference between said first and second voltages provided at said outputs; means for supplying red and blue color difference signals (R-Y) and (B-Y) corresponding to the respective colors of the light received by said first and second photo-sensing elements; first and second combining means for combining said red and blue color difference signals, respectively, with said difference signal to vary the levels of said red and blue color difference signals, said first combining means comprising subtracting means for subtracting said difference signal from said red color difference signal and said second combining means comprising adding means for adding said difference signal to said blue color difference signal; adjusting means coupled to said first and second combining means for adjusting the level of the respective red and blue color difference signals from said subtracting and adding means, respectively, to substantially the white balanced levels thereof at said predetermined color temperature; and wherein said differential amplifier means includes a current source for producing a substantially constant current as a function of the luminance signal derived from the televised scene; whereby said difference signal produced by said differencing means and supplied to said subtracting means and to said adding means is a portion of said luminance signal, which portion is determined by the change in the color temperature of said televised scene.

9. Apparatus for white color balance in the event that the color temperature of a televised scene changes from a predetermined level, comprising color temperature detecting means, including first and second semiconductor photo-sensing elements connected in series circuit, said first and second photo-sensing elements being oppositely poled in said series circuit, means for supplying light of predetermined respective colors having respectively different spectral characteristics to said first and second photo-sensing elements including a green light filter for supplying substantially only green light to said first photo-sensing element and a light filter for supplying light of a different color to said second photo-sensing elements, and means coupled across opposite ends of said series circuit for producing a signal indicative of color temperature and representing the ratio of the intensity of said light of a different color to the intensity of said green light in said televised scene; differential amplifier means connected to receive said signal and having an output for providing a white-balanced voltage representing said different color light; said differential amplifier means including a constant current source having an input terminal supplied with a voltage corresponding to said different color light intensity; and an amplifier for supplying said signal to said differential amplifier means.

10. The apparatus of claim 9 wherein said amplifier has a gain between 1 and 2.

11. The apparatus of claim 9 wherein said light of a different color is red light.

12. The apparatus of claim 9 wherein said light of a different color is blue light.

13. The apparatus of claim 9 wherein $V_G$ is a voltage corresponding to the intensity of said green light, x represents the ratio of said voltage corresponding to said different color light intensity to said voltage corresponding to the green light intensity, a represents the gain of said amplifier, and said white-balanced voltage representing said different color light provided by said differential amplifier means is a function of $$\frac{x}{1+(x)^a} \cdot V_G.$$

* * * * *